Aug. 30, 1927.
G. W. COOKE
FAUCET
Filed Sept. 17, 1925
1,640,692
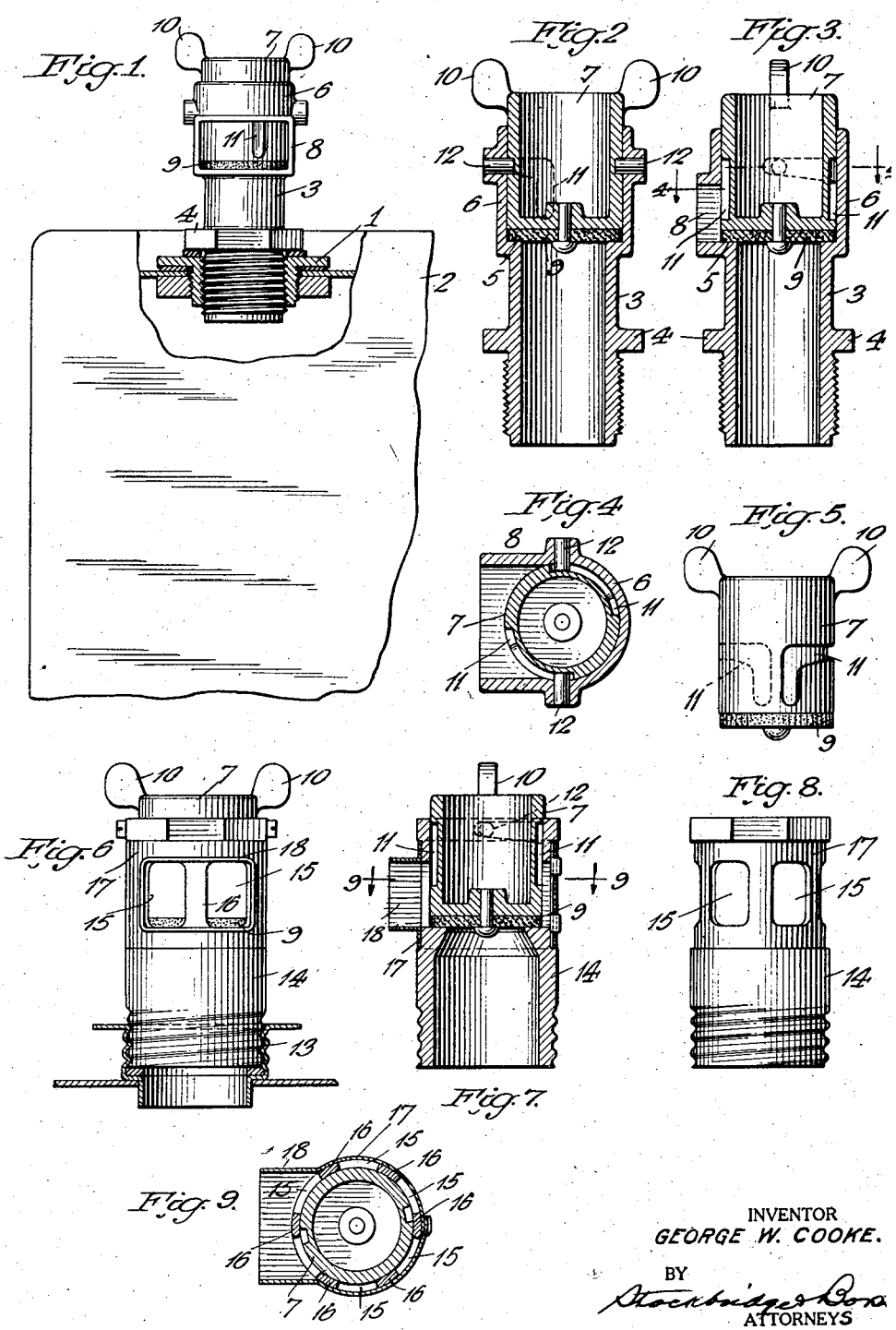
INVENTOR
GEORGE W. COOKE.
BY
Stockbridge Borst
ATTORNEYS Patented Aug. 30, 1927.

1,640,692

UNITED STATES PATENT OFFICE.

GEORGE W. COOKE, OF JAMAICA, NEW YORK, ASSIGNOR TO GEORGE W. COOKE CO., INC., A CORPORATION OF NEW YORK.

FAUCET.

Application filed September 17, 1925. Serial No. 56,824.

My invention has more particular application to faucets for drawing relatively heavy or slow running liquids, such as oil. It is desirable for such purpose that a faucet have a comparatively large passage and discharge opening, and that it be capable of being quickly opened and closed by a simple movement. In other words the faucet should be "quick opening" and "free flowing."

The barrel or tubular body of my faucet has a passage large enough for the oil to flow freely through it, and the valve is of the push-pull plug type. The valve head or chamber is a cylinder with a lateral outlet or discharge spout just in advance of the valve seat with a capacity sufficient to take care of the maximum quantity of liquid which can flow through the inlet passage.

Suitable guide and stop means must be provided for the valve plug, and it is characteristic of faucets of this type which have heretofore been used for this purpose that the oil or other liquid will work past the plug and leak out around the end of the valve head when the faucet is open. This has been due to the form of plug together with the guide and stop means therefor which have been employed. It will be appreciated that with a spout of such large proportions, the plug has a considerable range of movement from its seated to its completely open position and even though the plug will tightly seal the outer open end of the valve chamber when the plug is way out to its open position, nevertheless the configuration of such plugs has been such that the liquid can get into the outer cylindrical end of the valve chamber when the plug is in an intermediate position. This is the result of the nature of the guide and stop means for the plug.

One of the purposes of my invention is to provide a valve head and plug of such construction that the valve will at all times and in every part of its movement form an effective seal or closure for the outer end of the valve head, and may at the same time be readily and quickly moved axially in and out to close and open the faucet. Another object of my invention is to provide a simple and yet effective clamping and locking means for the plug. Other objects and advantages of my invention will appear from the following particular description, among which are included simplicity, cheapness of construction, reliability of operation and facility of manipulation.

In accordance with my invention I employ a cylindrical plug which fits accurately into the valve head and is of sufficient length at least to cover the outlet opening when the valve is seated. The plug is ordinarily of metal and hollow for the purpose of lightness and economy of metal. The inner or head end of the plug will be closed and a suitable gasket may be secured at its end. This more or less cup-shaped plug has a portion extending beyond the end of the valve chamber for the purpose of manipulation and it serves as a piston in the cylindrical head. The parts are preferably carefully fitted so as to make a tight seal, and this seal becomes a perfect one for all practical purposes when there is a film of oil or other liquid present.

With such a form of piston or plug, there is no way that the liquid can escape and work out around the outer end of the head. The plug guiding means comprises two bayonet-slot shaped grooves in the wall of the plug together with cooperative pins in the outer end of the valve head beyond the spout opening, the two being 180 degrees apart. The circumferential portion of the grooves at their outer end will serve to cam the plug tightly against its seat, being properly shaped for that purpose. The inner end of the longitudinal component of the guide grooves is considerably short of the inner end of the plug, and there is therefore no interruption to the piston surface at the inner end of the plug which forms the seal for the outer end of the valve head when the plug is retracted to the open position. The two grooves are so disposed that while one of them is uncovered by the spout opening when the plug is locked in closed position, the rotative movement of the plug to unlock it will bring the groove around to concealed position. The width of the spout opening is, at most, preferably less than 180 degrees, and thus it is possible to have both grooves completely concealed or covered by the wall of the head as the plug is being moved from closed to open position. I have found that there will be virtually no oil or other liquid caught in a groove which is exposed during the opening of the plug, due to the fact that the plug is pulled open so quickly and the further fact that the groove is down and therefore unlikely to catch any of the liquid.

My invention further contemplates an angularly adjustable spout. Faucets of this type sometimes screw up against a stop, and then it frequently happens that the spout or discharge orifice is not properly disposed in order to dispense the liquid from the receptacle as desired. This disadvantage is obviated by my adjustable spout. My invention also comprehends other features of construction as will hereinafter more fully appear.

I shall now describe the illustrated embodiment of my invention and shall thereafter point out my invention in claims.

Fig. 1 is an elevation of an embodiment of my invention shown disposed in a receptacle the immediately adjacent portion of which is in section.

Fig. 2 is a longitudinal central section of the faucet shown in Fig. 1 on a somewhat enlarged scale.

Fig. 3 is a central longitudinal section of the same on a plane at right angles to that of Fig. 2.

Fig. 4 is a transverse section on the irregular line 4—4 of Fig. 3.

Fig. 5 is a detail of the plug in elevation.

Fig. 6 is a similar view to Fig. 1 of a modified embodiment of my invention.

Fig. 7 is a sectional elevation of the faucet shown in Fig. 6.

Fig. 8 is a detail in elevation of the body member of the faucet.

Fig. 9 is a transverse section on line 9—9 of Fig. 7.

The faucet of Fig. 1 is shown as screwed in a bung member 1 of a barrel or other receptacle 2. The inner end of the tubular body or barrel 3 of the faucet is provided with screw threads immediately in front of which is the usual angular tool receiving part 4. The inlet portion of the faucet body terminates in an overhanging shoulder constituting a valve seat 5 and beyond this the body is continued in an enlarged cylindrical valve chamber or head 6. The outer end of this valve head is open and receives the valve plug 7. Immediately in front of the valve seat 5, the head 6 is provided with a comparatively wide discharge spout or opening 8, the capacity of which at least equals that of the inlet discharge. As shown, the width of the discharge opening is slightly less than the diameter of the valve head, and its dimension longitudinally of the valve head is more than one-half the length of the valve head.

The valve plug 7 is shown as a cup-shaped, cylindrical member closed at its inner end and having a gasket 9 secured thereto by a central rivet. This plug is of greater length than the valve chamber and therefore protrudes beyond the valve head and has two lateral finger pieces 10 on its outer end. This plug 7 is of metal and fits accurately in the valve head 6.

In order to guide the valve plug 7 and to limit its movement, two angular grooves 11 are shown as formed in the wall of the plug, and two lateral pins 12 in the valve head cooperate with these grooves. The grooves and pins are spaced 180 degrees. The longitudinal component of the grooves is such as to give the plug a range of movement from the seated position shown in the drawings to a completely open position in which the gasket 9 is practically flush with the outer limit of the discharge opening. The circumferential component of each groove has its inner edge inclined so as to meet the longitudinal component at an obtuse angle. This wall serves as a cam in conjunction with the cooperating pin 12 to clamp and lock the plug tightly on its seat when the plug is turned as far as this component of the groove will permit after it has been pushed against its seat. As shown in Fig. 1, the longitudinal component of one of the grooves is visible through the outlet orifice when the plug is clamped shut, but the rotative movement of the plug which is necessary preliminary to its opening movement brings the exposed groove component 11 underneath the wall of the head 6 back of the discharge opening. An uninterrupted surface of the plug 7 is thus presented to the discharge opening as the plug is moved axially from the open to the closed position.

The form of faucet shown in Figs. 6 to 9 inclusive will preferably be used when the faucet screws up against the stop such as shown in Fig. 6. Small portable oil cans, for example, commonly have a sheet metal screw threaded socket 13 soldered or otherwise secured in one end, and a screw plug is ordinarily provided with the can for closing this socket. If the user wishes to substitute a faucet for the plug, as is shown in Fig. 6, he finds that it very often has its spout or discharge orifice at an inconvenient angle due to the fact that the faucet screws up against the gasket in the bottom of the socket as a stop. For such and similar situations, I have provided a faucet body 14 which is similar in principle to that shown in the preceding figures and takes the plug 7 as above described. This faucet body 14, however, instead of having the spout integral therewith, is provided around the valve chamber with a circumferential series of openings 15 separated by bars 16. About this fits a spout sleeve 17 which may be simply a sheet metal band with the spout 18 formed intermediate of its ends and with its ends joined together in any suitable way. This sleeve may be angularly adjustable upon the valve head and the liquid will flow from the valve head into the spout in any position which the spout may have due to the circumferential disposition of the openings 15.

It is obvious that various modifications may be made in the construction shown in the drawings and above particularly described within the principle and scope of my invention.

I claim:

1. A faucet comprising a tubular body including an inlet portion and an enlarged cylindrical valve chamber joining the inlet portion with a shoulder constituting a valve seat and having a circumferential series of openings in front of the valve seat, a spout sleeve angularly adjustable about the perforated part of the valve chamber and having a laterally open spout, and a cylindrical valve plug fitting within the valve chamber throughout and beyond the perforated portion and axially slidable therein to open and close the faucet.

2. A faucet comprising a tubular body including an inlet portion and an enlarged cylindrical valve chamber joining the inlet portion with a shoulder constituting a valve seat and having a circumferential series of openings in front of the valve seat, a spout sleeve angularly adjustable about the perforated part of the valve chamber and having a laterally open spout, a cylindrical valve plug fitting within the valve chamber throughout and beyond the perforated portion and axially slidable therein to open and close the faucet and means to guide the plug in its axial movement and to lock it in closed position.

In witness whereof, I hereunto subscribe my signature.

GEORGE W. COOKE.